US011658911B2

(12) United States Patent
Terstrup

(10) Patent No.: US 11,658,911 B2
(45) Date of Patent: May 23, 2023

(54) SYSTEM AND METHOD FOR LOW LATENCY NETWORK SWITCHING

(71) Applicant: Microchip Technology Inc., Chandler, AZ (US)

(72) Inventor: Morten Terstrup, Stenlose (DK)

(73) Assignee: Microchip Technology Inc., Chandler, AZ (US)

( * ) Notice: Subject to any disclaimer, the term of this patent is extended or adjusted under 35 U.S.C. 154(b) by 34 days.

(21) Appl. No.: 17/383,755

(22) Filed: Jul. 23, 2021

(65) Prior Publication Data

US 2022/0191144 A1 Jun. 16, 2022

Related U.S. Application Data

(60) Provisional application No. 63/126,482, filed on Dec. 16, 2020.

(51) Int. Cl.
| | |
|---|---|
| *H04L 47/2425* | (2022.01) |
| *H04L 47/28* | (2022.01) |
| *H04L 49/00* | (2022.01) |
| *H04L 47/625* | (2022.01) |
| *H04L 45/745* | (2022.01) |

(52) U.S. Cl.
CPC .... *H04L 47/2433* (2013.01); *H04L 45/74591* (2022.05); *H04L 47/28* (2013.01); *H04L 47/625* (2013.01); *H04L 49/3018* (2013.01)

(58) Field of Classification Search
CPC ........... H04L 47/2433; H04L 45/74591; H04L 47/28; H04L 47/625; H04L 49/3018
See application file for complete search history.

(56) References Cited

U.S. PATENT DOCUMENTS

| | | | |
|---|---|---|---|
| 6,611,519 | B1 | 8/2003 | Howe |
| 8,429,325 | B1 | 4/2013 | Onufryk et al. |
| 9,654,416 | B2 | 5/2017 | Chandhoke et al. |
| 9,967,209 | B2 | 5/2018 | Chandhoke et al. |
| 10,341,260 | B2 | 7/2019 | Aravinthan et al. |

(Continued)

FOREIGN PATENT DOCUMENTS

TW 200805952 A 1/2008

OTHER PUBLICATIONS

PCT/US2021/053280, International Search Report and Written Opinion, European Patent Office, dated Jan. 24, 2022.

(Continued)

*Primary Examiner* — Omer S Mian
(74) *Attorney, Agent, or Firm* — Glass and Associates; Molly Sauter; Kenneth Glass

(57) ABSTRACT

A network switch and associated method of operation for establishing a low latency transmission path through the network which bypasses the packet queue and scheduler of the switch fabric. The network switch transmits each of a plurality of data packets to the identified destination egress port over the low latency transmission if the data packet is identified to be transmitted over the low latency transmission path from the ingress port to the destination egress port, and transmits the data packet to the destination egress port through the packet queue and scheduler if the data packet is not identified to be transmitted over the low latency transmission path from the ingress port to the destination egress ports.

22 Claims, 3 Drawing Sheets

(56) References Cited

U.S. PATENT DOCUMENTS

| | | |
|---|---|---|
| 10,797,686 B1 | 10/2020 | Terstrup et al. |
| 2002/0118640 A1 | 8/2002 | Oberman et al. |
| 2005/0058149 A1 | 3/2005 | Howe |
| 2014/0098818 A1 | 4/2014 | Matthews et al. |
| 2014/0219087 A1* | 8/2014 | Matthews ............... H04L 47/28 370/231 |
| 2016/0380922 A1* | 12/2016 | Gross, IV ............... H04L 47/31 370/392 |
| 2017/0201468 A1* | 7/2017 | Gabbay ................. H04L 49/901 |
| 2018/0227247 A1 | 8/2018 | Aravinthan et al. |
| 2020/0153721 A1 | 5/2020 | Holbrook et al. |
| 2020/0259896 A1 | 8/2020 | Sachs et al. |
| 2020/0314030 A1 | 10/2020 | Goel et al. |

OTHER PUBLICATIONS

Search Report and Office Action, Taiwan International Property Office, dated Apr. 27, 2022.

* cited by examiner

200

205
ESTABLISHING A LOW LATENCY TRANSMISSION PATH THROUGH A NETWORK SWITCH, WHEREIN THE NETWORK SWITCH COMPRISES A PLURALITY OF INGRESS PORTS, A PLURALITY OF EGRESS PORTS AND A SWITCH FABRIC COMPRISING A PACKET QUEUE AND SCHEDULER THROUGH WHICH THE PLURALITY OF INGRESS PORTS COMMUNICATE WITH THE PLURALITY OF EGRESS PORTS AND WHEREIN THE LOW LATENCY TRANSMISSION PATH BYPASSES THE PACKET QUEUE AND SCHEDULER OF THE SWITCH FABRIC

210
RECEIVING A PLURALITY OF DATA PACKETS AT ONE OR MORE OF THE PLURALITY OF INGRESS PORTS (OPT. EACH DATA PACKET OF THE PLURALITY OF DATA PACKETS COMPRISES A PLURALITY OF WORDS, EACH OF THE PLURALITY OF WORDS COMPRISES A NUMBER OF BYTES)

215
COLLECTING A FIRST PORTION OF ONE OR MORE OF THE PLURALITY OF DATA PACKETS AT A COLLECTION MODULE (OPT. THE NUMBER OF BYTES OF THE FIRST PORTION OF THE DATA PACKET OF THE ONE OR MORE OF THE PLURALITY OF DATA PACKETS COLLECTED AT THE COLLECTION MODULE IS LESS THAN THE NUMBER OF BYTES OF EACH OF THE PLURALITY OF WORDS OF EACH DATA PACKET OF THE PLURALITY OF DATA PACKETS)

220
FOR EACH DATA PACKET OF THE ONE OR MORE OF THE PLURALITY OF DATA PACKETS, ANALYZING THE FIRST PORTION OF THE DATA PACKET TO IDENTIFY ONE OF THE PLURALITY OF EGRESS PORTS AS A DESTINATION EGRESS PORT OF THE DATA PACKET AND TO IDENTIFY IF THE DATA PACKET IS TO BE TRANSMITTED OVER THE LOW LATENCY TRANSMISSION PATH FROM THE INGRESS PORT TO THE DESTINATION EGRESS PORT (OPT. MATCHING THE FIRST PORTION OF THE DATA PACKET AGAINST A PATTERN MATCHING TABLE, INCLUDING BUT NOT LIMITED TO A TERNARY CONTENT ADDRESSABLE MEMORY (TCAM) STORING A PLURALITY OF DESTINATION ADDRESSES)

225
TRANSMITTING THE DATA PACKET TO THE IDENTIFIED DESTINATION EGRESS PORT OVER THE LOW LATENCY TRANSMISSION IF THE DATA PACKET IS IDENTIFIED TO BE TRANSMITTED OVER THE LOW LATENCY TRANSMISSION PATH FROM THE INGRESS PORT TO THE DESTINATION EGRESS PORT, AND TRANSMITTING THE DATA PACKET TO THE DESTINATION EGRESS PORT RESPONSIVE TO THE PACKET QUEUE AND THE SCHEDULER IF THE DATA PACKET IS NOT IDENTIFIED TO BE TRANSMITTED OVER THE LOW LATENCY TRANSMISSION PATH FROM THE INGRESS PORT TO THE DESTINATION EGRESS PORTS

FIG. 2

SYSTEM AND METHOD FOR LOW LATENCY NETWORK SWITCHING

CROSS-REFERENCE TO RELATED APPLICATIONS

This application claims priority to U.S. Provisional Patent Application No. 63/126,482, entitled "Direct Port to Port Switching for Low latency Transfers in Ring Topologies," filed Dec. 16, 2020, the entirety of which is incorporated herein by reference.

BACKGROUND OF THE INVENTION

Network switches are critical elements of any network infrastructure. Network switches check data packets arriving at ingress ports, determine the appropriate egress port for the intended destination device, and then transmit the packet data packet to the correct destination via an egress port. Improvements in data packet processing by network switches are desirable to reduce latency in the delivery of data packets to one or more destination devices.

Accordingly, there is a need for a method and apparatus that provides a low latency transmission path through a network switch that can be used to transmit time-sensitive data packets.

SUMMARY OF THE INVENTION

In various embodiments, an improved network switch and method for operating a network switch are provided, wherein a low latency transmission is established through the network switch for the transmission of data packets requiring low latency transmission. The network switch and associated method does not require coupling an independent, dedicated switching circuit to the network switch to provide the low latency transmission path. As such, the disclosed network switch provides both a low latency transmission path for traffic that requires low latency transmission and a standard transmission path for traffic that does not require low latency transmission.

In a first embodiment, a method is provided for operating a network switch. The method includes, establishing a low latency transmission path through a network switch, wherein the network switch comprises a plurality of ingress ports, a plurality of egress ports and a switch fabric comprising a packet queue and scheduler through which the plurality of ingress ports communicate with the plurality of egress ports and wherein the low latency transmission path bypasses the packet queue and scheduler of the switch fabric. The method further includes, receiving a plurality of data packets at one or more of the plurality of ingress ports, collecting a first portion of one or more of the plurality of data packets at a collection module and, for each data packet of the one or more of the plurality of data packets, analyzing the first portion of the data packet to identify one of the plurality of egress ports as a destination egress port of the data packet and to identify if the data packet is to be transmitted over the low latency transmission path from the ingress port to the destination egress port. The method additionally includes, transmitting the data packet to the identified destination egress port over the low latency transmission if the data packet is identified to be transmitted over the low latency transmission path from the ingress port to the destination egress port, and transmitting the data packet to the destination egress port responsive to the packet queue and scheduler if the data packet is not identified to be transmitted over the low latency transmission path from the ingress port to the destination egress ports.

In accordance with the disclosure, each data packet of the one or more of the plurality of data packets includes a plurality of words, each of the plurality of words includes a number of bytes and the number of bytes of the first portion of each of the plurality of data packets collected at the collection module is less than the number of bytes of each of the plurality of words of each data packet of the one or more of the plurality of data packets.

In a particular embodiment, a flag may be set for the data packet if the data packet is identified to be transmitted over the low latency transmission path from the ingress port to the destination egress port. Subsequently, the data packet may be transmitted to the destination egress port over the low latency transmission path responsive to the set flag.

In a specific embodiment, the network switch may be a time-sensitive (TS) network switch. In this embodiment, analyzing the first portion of the data packet to identify if the data packet is to be transmitted over the low latency transmission path from the ingress port to the destination egress port may be performed during a specified time window, as determined by the TS network switch. Additionally, the destination egress port may further be configured to be available to receive one or more data packets over the low latency transmission path during the specified time window and the one or more data packets may be transmitted to the destination egress port over the low latency transmission path during the specified time window.

In another embodiment, a network switch is provided which includes, a plurality of ingress ports, a plurality of egress ports, a switch fabric comprising a packet queue and scheduler through which the plurality of ingress ports communicate with the plurality of egress ports and a low latency transmission path for bypassing the packet queue and scheduler of the switch fabric. In this embodiment, the switch fabric is configured to receive a plurality of data packets at one or more of the plurality of ingress ports and, for each of the plurality of data packets received, analyze a first portion of the data packet to identify one of the plurality of egress ports as a destination egress port of the data packet and identify if the data packet is to be transmitted over the low latency transmission path from the ingress port to the destination egress port. The switch fabric is further configured to transmit the data packet to the identified destination egress port over the low latency transmission if the data packet is identified to be transmitted over the low latency transmission path from the ingress port to the destination egress port, and to transmit the data packet to the destination egress port responsive to the packet queue and scheduler if the data packet is not identified to be transmitted over the low latency transmission path from the ingress port to the destination egress ports.

In an additional embodiment, a switch fabric is provided which includes, a packet queue and scheduler through which a plurality of ingress ports coupled to the packet queue and scheduler communicate with a plurality of egress ports coupled to the packet queue and scheduler and a low latency transmission path for bypassing the packet queue and scheduler. The switch fabric further includes, a collection module to collect a first portion of one or more of a plurality of data packets received at one or more of the plurality of ingress ports and a packet analyzer to analyze, for each data packet of the one or more of the plurality of data packets, the first portion of the data packet to identify one of the plurality of egress ports as a destination egress port of the data packet and to identify if the data packet is to be transmitted over the low latency transmission path from the ingress port to the destination egress port. In this embodiment, the switch fabric is configured to transmit the data packet to the identified destination egress port over the low latency transmission if the data packet is identified to be transmitted over the low latency transmission path from the ingress port to the destination egress port, and to transmit the data packet to the destination egress port responsive to the packet queue and scheduler if the data packet is not identified to be transmitted over the low latency transmission path from the ingress port to the destination egress ports.

Accordingly, in various embodiments, a system and method are provided for enabling, in a common network switch, both a low latency transmission path for traffic that requires low latency transmission and a standard transmission path for traffic that does not require low latency transmission.

BRIEF DESCRIPTION OF DRAWINGS

For a fuller understanding of the invention, reference should be made to the following detailed disclosure, taken in connection with the accompanying drawings, in which:

FIG. 2 is a flow diagram illustrating a method for operating a network switch having a low latency transmission path, in accordance with an embodiment of the present invention.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
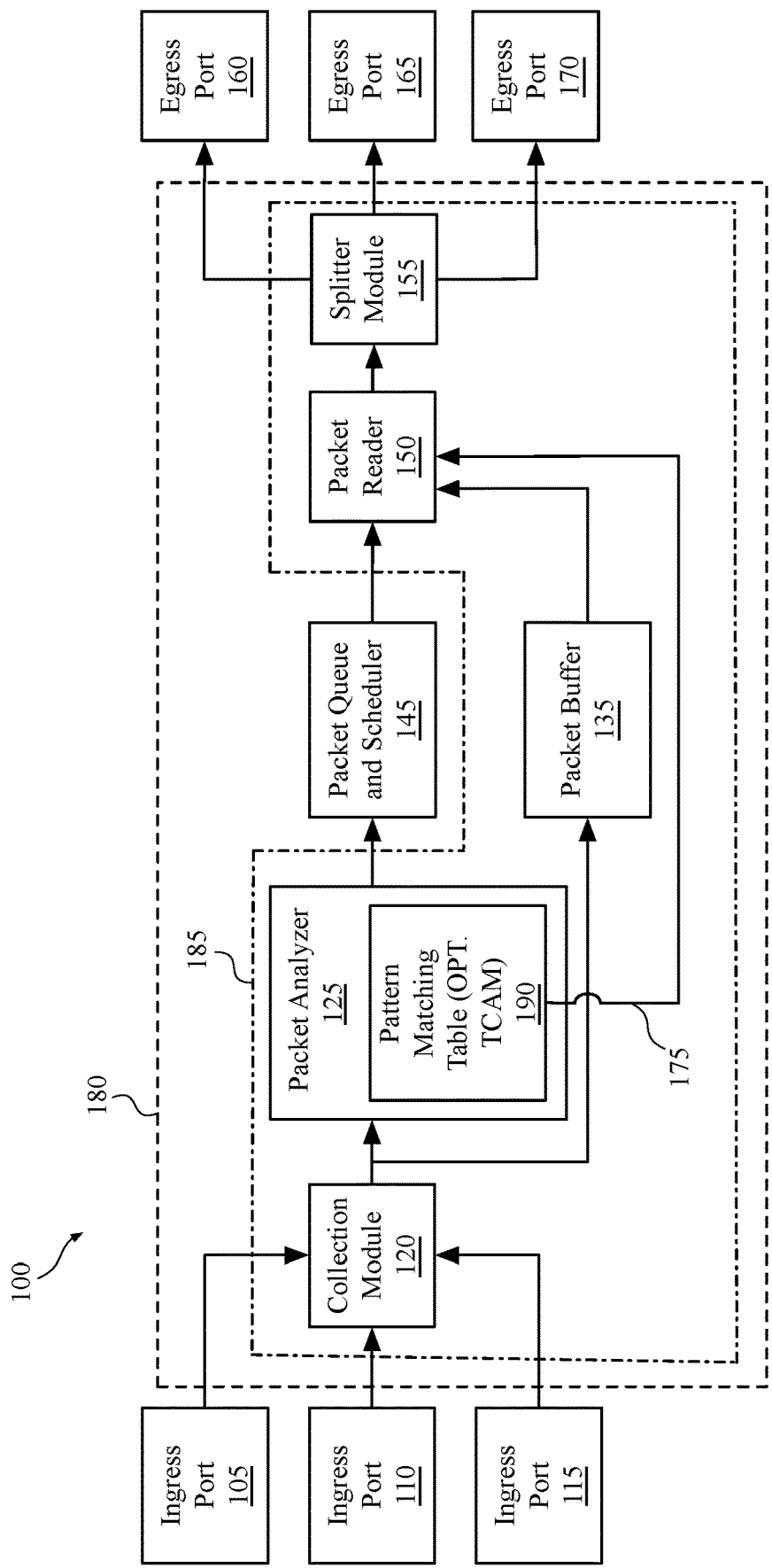
FIG. 1 is a block diagram illustrating a network switch comprising a low latency transmission path, in accordance with an embodiment of the present invention.

With reference to FIG. 1, a network switch 100, such as a network switch that switches data packets from one or more ingress ports 105, 110, 115 to one or more egress ports 160, 165, 170 through a switch fabric 180 is illustrated. The network switch 100 may be part of a network that can include various network devices, including but not limited to, one or more servers, computers, and sensors. Each of the network devices may be associated with one or more of the ingress ports and the egress ports and the network devices may be connected or otherwise be in packet-based communication with each other, through, or using, the network switch. While three ingress ports 105, 110, 115 and three egress ports 160, 165, 170 are illustrated, this is not meant to be limiting in any way. The number of ingress ports is not constrained to be equal to the number of egress ports, the number of ingress ports may be of any amount and the number of egress ports may be of any amount.

The network switch 100 may receive network data in the form of data packets and the network switch 100 may transmit the data packets between the ingress ports 105, 110, 115 and the egress ports 160, 165, 170 through a switch fabric 180 of the network switch 100 to establish communication between the various network devices. The switch fabric 180 provides a communication path for the data packets between the ingress ports 105, 110, 115 and the egress ports 160, 165, 170 such that any of the ingress ports 105, 110, 115 can be in communication with any of the egress ports 160, 165, 170.

The network switch 100 and the switch fabric 180 may include programmable circuitry to perform the functionality of the network switch 100 and the switch fabric 180.

Latency is introduced by a network switch during data packet reception, analysis, queuing, scheduling, forwarding and transmission of the data packets through the switch fabric 180. In various applications, including but not limited to automotive and industrial applications, network switches are often responsible for the transmission of both time-sensitive and best-effort network traffic. In networks where a mix of best-effort and highly time-sensitive traffic are interleaved in the same infrastructure, the disclosed network switch 100 provides low latency switching for time-sensitive traffic, thereby reducing the latency of such traffic.

In the example embodiment of FIG. 1, the switch fabric 180 of the network switch 100 includes a packet queue and scheduler 145 which schedules the transmission of packets received at ingress ports 105, 110, 115 through the respective egress ports 160, 165, 170. Data packets identified as network traffic requiring best-effort transmission through the network switch 100 are scheduled by the packet queue and scheduler 145. The network switch 100 additionally includes a low latency transmission path 185 for bypassing the packet queue and scheduler 145 of the switch fabric 180. As such, the low latency transmission path 185 of the switch fabric 180 may be used for the transmission of time-sensitive traffic between the ingress ports 105, 110, 115 and the egress ports 160, 165, 170 while the packet queue and scheduler 145 may be used for scheduling the transmission of best-effort traffic, as described in detail below.

In addition to the packet queue and scheduler 145, the switch fabric 180 includes a collection module 120 coupled to the ingress ports 105, 110, 115, a packet analyzer 125 coupled between the collection module 120 and the packet queue and scheduler 145, a packet reader 150 coupled to an output of the packet queue and scheduler 145, a splitter module 155 coupled to an output of the packet reader 150 and a packet buffer 135 coupled between an output of the collection module and the packet reader 150. As shown in FIG. 1, the low latency transmission path 185 shares the collection module 120, the packet analyzer 125, the packet buffer 135, the packet reader 150 and the splitter module 155 of the switch fabric 180. As also shown in FIG. 1, the low latency transmission path 185 does not include the packet queue and scheduler 145 of the switch fabric 180.

The collection module 120 of the switch fabric 180 comprises circuitry configured to collect a first portion of one or more of the plurality of data packets received from the ingress ports 105, 110, 115. In addition, collection module 120, collects data of the received data packets into a predetermined word width in accordance with the configuration of switch fabric 180. The first portion of each of the data packets is selected to be a fewer number of bytes than the data packet. There is no requirement that the first portion of all of the data packets be collected by collection module 120, and in one example, the first portion of each of the data packets of only a particular ETYPE are collected by collection module 120 in addition to collection of data of all of the received data packets into the predetermined word width in accordance with the configuration of switch fabric 180. In particular, each of the data packets received at the ingress ports 105, 110, 115 includes a plurality of words, each of the plurality of words comprises a number of bytes and the number of bytes of the first portion of each of the plurality of data packets collected at the collection module is less than the number of bytes of each of the plurality of words of each of the plurality of data packets. In a specific non-limiting example, 64-byte data packets may be transmitted from the ingress ports 105, 110, 115 in parallel and collected at the collection module 120. The collection module 120 may then collect a first portion of one or more data packets, which may include only 32 bytes of the 64-byte data packet. As such, the collection module 120 of the switch fabric 180 is configured to collect a smaller portion of bytes of the data packet which allows for faster access to the packet analyzer 125 of the switch fabric 180, regardless of the contents of the data packets. For packets larger than 64-byte data packets, the first portion of the data packet may still include only 32 bytes of the data packet.

The packet analyzer 125 of the switch fabric 180 is coupled to receive the first portion of each data packet from the collection module 120 and a packet buffer 135 of the switch fabric 180 is coupled to an output of the collection module 120 and is configured to store the data packets received at the ingress ports 105, 115, 115. The packet analyzer 125 analyzes the first portion of each of the plurality of data packets to identify one of the plurality of egress ports 160, 165, 170 as a destination egress port of the data packet and to determine if the data packet is to be transmitted over the low latency transmission path 185 from the ingress port to the destination egress port or if the data packet is to be transmitted over the switch fabric 180 from the ingress port to the destination egress port. The packet analyzer 125 includes a pattern matching table 190 for identifying if the data packet is to be transmitted over the low latency transmission path 185. In general, the pattern matching table 190 may be implemented in a memory device and in particular the pattern matching table 190 may be implemented in a ternary content addressable memory (TCAM). In addition to the above, packet analyzer 125 functions to provide other functionality for network switch 100, such as quality of service and MAC address functions, known to those skilled in the art. Thus, packet analyzer 125 may receive more than the first portion of each data packet in order to provide the other functionality for network switch 100.

The pattern matching table 190 stores known patterns of bytes for data packets that are considered time-sensitive and therefore should be transmitted over the low latency transmission path 185. In particular, the packet analyzer 125 is configured to analyze one or more bytes of the first portion of each data packet to identify a destination egress port for the data packet. The packet analyzer 125 also matches the one or more bytes of the first portion of each data packet against the pattern matching table 190 to determine whether the data packet should be transmitted over the low latency transmission path 185. If a pattern of the one or more bytes of the first portion of the data packet matches a pattern stored in the pattern matching table 190, then the data packet is identified as to be transmitted over the low latency transmission path 185. In the alternative, if there is not a match between the pattern of the first portion of the data packet and the pattern matching table 190 then the data packet is transmitted through the packet queue and scheduler 145 and not over the low latency transmission path 185.

In a specific embodiment for an example protocol, the packet analyzer 125 extracts at least a byte pattern comprising a destination MAC-address (DMAC), EtherType field (ETYPE) and identifier (ID) from the first portion of the data packet. The packet analyzer 125 then attempts to match the extracted pattern with a pattern stored in the pattern matching table 190. If a match is identified, then the packet analyzer 125 sets a flag for the data packet indicating that the data packet is to be transmitted over the low latency transmission path 185.

In a non-limiting exemplary embodiment, assuming that the low latency transmission path 185 is to be utilized for time-sensitive data packets identified by the values: DMAC=0011222334455, ETYPE=88F6 and bytes 16-18 containing the 3-byte ID=010203. By programming these values into the pattern matching table 190 of the packet analyzer 125, when there is a match between a received data packet and the pattern matching table 190, packet analyzer 125 sets a flag indicating that the data packet is time-sensitive and is to be transmitted over the low latency transmission path 185.

The packet buffer 135 of the switch fabric 180 stores the data packets that are collected by the collection module 120 as the first portion of the data packets are analyzed by the packet analyzer 125. When a flag is set for one or more data packets following the analysis of the first portion of the data packets, the flag is communicated to the packet reader 150 over bypass path 175 of low latency transmission path 185. In addition to address of the data packet in packet buffer 135, and an identifier of the egress port are communicated to the packet reader 150 over bypass path 175 of low latency transmission path 185. There is no requirement that a particular separate flag be set, and in one example, packet reader 150 responds to receipt of an address of the data packet in packet buffer 135, and an identifier of the egress port, over the bypass path 175, in lieu of a particular flag. In response to receiving the communication over the bypass path 175, such as the flag, or an address of the data packet in packet buffer 135, and an identifier of the egress port, at the packet reader 150, the packet reader 150 promptly begins reading the respective data packets out of the packet buffer 135. As such, in response to the communication over the bypass path 175, the data packets are not scheduled to the packet reader 150 by the packet queue and scheduler 145, but instead are read out promptly from the packet buffer 135 by packet reader 150 responsive to the communication over the bypass path 175 of the low latency transmission path 185, thereby avoiding any latency caused by the packet queue and scheduler 145. The packet reader 150 then provides the data packets read from the packet buffer 135 to the splitter module 150. The splitter module 150 is configured to distribute the data packets to the identified destination egress port of the plurality of egress ports 160, 165, 170 for the data packet, with the identified destination egress port provided by the packet analyzer 125. As such, the network switch 100 transmits each of the data packets to the identified destination egress port over the low latency transmission 185 if the data packet is identified to be transmitted over the low latency transmission 185 path from the ingress port to the destination egress port, and the switch fabric 180 transmits the data packet to the destination egress port responsive to scheduling by the packet queue and scheduler 145 if the data packet is not identified to be transmitted over the low latency transmission path 185 from the ingress port to the destination egress ports.

The packet queue and scheduler 145 of the switch fabric 180 operates in a similar manner to known standard switching techniques in which the data packets received at the ingress ports 105, 110, 115 are processed in a round-robin fashion, or other fashion, wherein only one input port has access to the packet queue and scheduler 145 during each clock cycle of the switch fabric 180. The packet buffer 135 enqueues the data packets and the packet reader 150 reads the packets from packet buffer 135 in accordance with the packet queue and scheduler 145. As previously described, the process of queuing and round-robin processing by packet queue and scheduler 145 adds undesirable latency into the network switch 100. While the added latency is acceptable for best-effort network traffic, it may not be acceptable for time-sensitive network traffic. The low latency transmission path 185 as disclosed provides a solution for transmitting both best-effort network traffic and time-sensitive network traffic in a common network switch 100.

In addition to identifying data packets for transmission over the low latency transmission path 185, the switch fabric 180 is further configured to operate under Time Sensitive Networking (TSN) standards. IEEE standards for TSN enable deterministic, real-time communication over Ethernet by using time synchronization and time slotting, which is shared between the network devices. By defining time slots, or windows, for data packet transmission, TSN ensures a bounded maximum latency for scheduled traffic through the network switch 100. If all devices operating in a TSN have a common understanding of the windows in time where low latency transfers can take place, the low latency transmission path 185 in each network switch 100 will contribute to an end-to-end low transfer delay. By implementing TSN in the network switch 100, the destination egress port is guaranteed to be available to receive data packets over the low latency transmission path 185 during the predetermined time window.

With the network switch 100 operating as a time-sensitive (TS) network switch in a TS network, the time-sensitive data packets are received at the plurality of ingress ports 105, 110, 115 during a specified time window, the destination egress port is configured by the packet queue and scheduler 145 to be available during the specified time window and the time-sensitive data packets are transmitted over the low latency transmission path 185 during the specified time window.

In a non-limiting example of the network switch 100 operating in a TSN environment, a cycle having a one second duration may be split into time windows. The ingress ports 105, 110, 115, the egress ports 160, 165, 170 and the network switch 100 are all aware of these time windows and are aligned with a common clock signal. In this example, a first window of time between 0ms and 850 ms in each cycle may be used for transmitting best-effort traffic in response to scheduling by the packet queue and scheduler 145 of the switch fabric 180. A second window of time between 850 ms and 860 ms in each cycle may be reserved for transmitting time-sensitive data packets over the low latency transmission path 185 to a destination egress port identified for time-sensitive data packets. During this second window of time, best-effort traffic to this identified destination egress port is blocked. A third window of time between 860 ms and 1000 ms may then be used for transmitting best-effort traffic again. There may be multiple such destination egress ports identified for time-sensitive data packets in network switch 100.

As such, through the common network time understanding provided by TSN, the network switch 100 can assure that data packets requiring low latency transmission are only received in the 850 ms to 860 ms time window, during which time, the network switch 180 can assure that the identified destination egress port for time-sensitive data packets is available during the time the low latency transmission path 185 is needed to transmit the time-sensitive data packets.

With reference to FIG. 2, a flow diagram is provided illustrating a method 200 for operating the network switch 100 having the low latency transmission path 185.

At 205 the method begins by establishing a low latency transmission path through a network switch, wherein the network switch comprises a plurality of ingress ports, a plurality of egress ports and a switch fabric comprising a packet queue and scheduler through which the plurality of ingress ports communicate with the plurality of egress ports and wherein the low latency transmission path bypasses the packet queue and scheduler of the switch fabric. With reference to FIG. 1, a low latency transmission path 185 is established through the network switch 100 comprising a plurality of ingress ports 105, 110, 115, a plurality of egress ports 160, 165, 170 and a switch fabric 180. The switch fabric 180 comprises a packet queue and scheduler 145 through which the plurality of ingress ports 105, 110, 115 communicates with the plurality of egress ports 160, 165, 170 and the low latency transmission path 185 bypasses the packet queue and scheduler 145 of the switch fabric 180.

At 210 the method continues by receiving a plurality of data packets at one or more of the plurality of ingress ports and at 215 by collecting a first portion of one or more of the plurality of data packets at a collection module. As shown in FIG. 1, data packets received at one or more of the plurality of ingress ports 105, 110, 115 are provided to a collection module 120, and the collection module 120 is configured to collect a first portion of one or more of the plurality of data packets. In some examples, a first portion of only some of the plurality of data packets are collected responsive to an ETYPE designation.

At 220 the method continues by, for each data packet of the plurality of data packets, analyzing the first portion of the plurality of data packets to identify one of the plurality of egress ports as a destination egress port of the data packet and to identify if the data packet is to be transmitted over the low latency transmission path from the ingress port to the destination egress port. As shown in FIG. 1, a packet analyzer 125 comprising a pattern matching table 190 is used to analyze the first portion of the data packets to identify one of the plurality of egress ports as a destination egress port of the data packet and to identify if the data packet is to be transmitted over the low latency transmission path 185 from the ingress port to the destination egress port.

The method concludes at 225 by transmitting the data packet to the identified destination egress port over the low latency transmission if the data packet is identified to be transmitted over the low latency transmission path from the ingress port to the destination egress port, and transmitting the data packet to the destination egress port responsive to the packet queue and scheduler if the data packet is not identified to be transmitted over the low latency transmission path from the ingress port to the destination egress ports. With reference to FIG. 1, the data packets identified to be transmitted over the low latency transmission path 185 by the packet analyzer 125 are transmitted to the destination egress port of the data packet over the low latency transmission path 185. Alternatively, the data packets not identified to be transmitted over the low latency transmission path 185 are transmitted to the destination egress port responsive to scheduling by the packet queue and scheduler 145.

Figure 3:
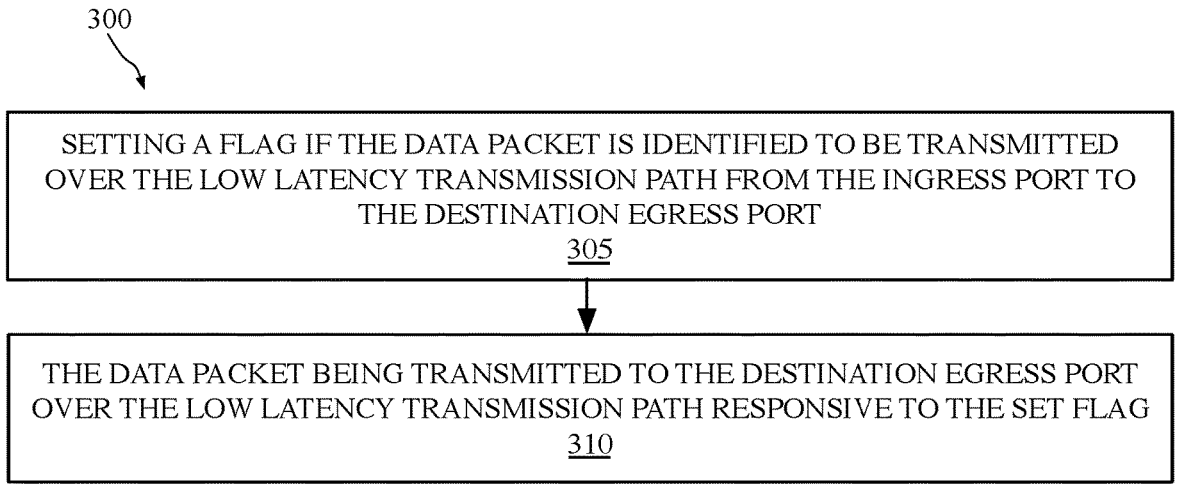
FIG. 3 is a flow diagram illustrating a method for setting a flag for one or more data packets identified as to be transmitted over a low latency transmission path, in accordance with an embodiment of the present invention.

FIG. 3 is a flow diagram 300 illustrating an example method for setting a flag for one or more data packets identified as to be transmitted over a low latency transmission path.

At 305 the method begins by setting a flag if the data packet is identified to be transmitted over the low latency transmission path from the ingress port to the destination egress port. With reference to FIG. 1, the packet analyzer 125 in combination with the pattern matching table 190 are used to identified if the data packet is to be transmitted over the low latency transmission path 185 from the ingress port to the destination egress port as determined by the packet analyzer 125.

The method concludes at 310 by the data packet being transmitted to the destination egress port over the low latency transmission path responsive to the set flag. With reference to FIG. 1, the packet analyzer 125 provides the flag to the packet reader 150 and the packet reader 150 reads the data packets from the packet buffer 135 responsive to the set flag, thereby transmitting the data packet to the destination egress port over the low latency transmission path.

Figure 4:
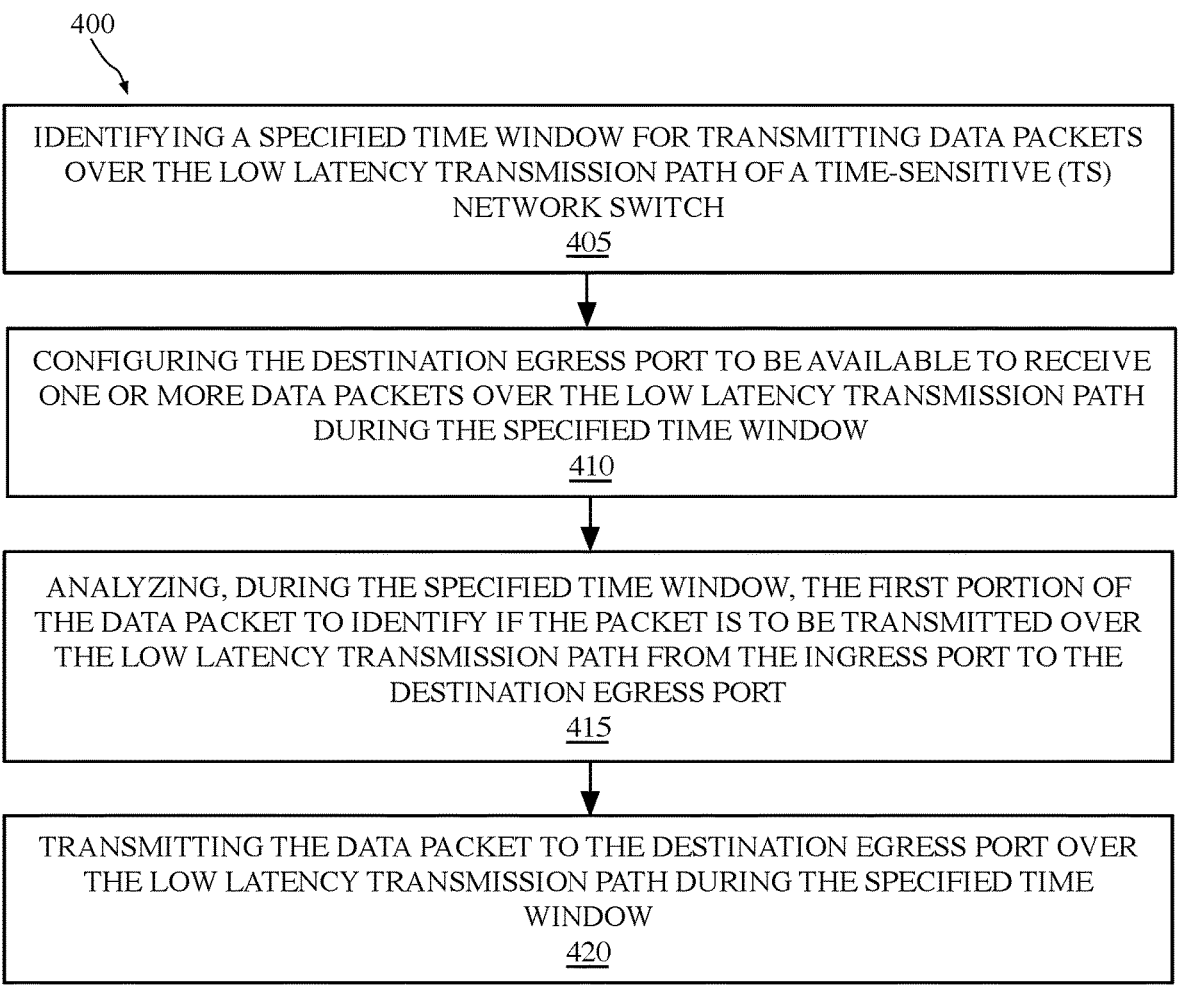
FIG. 4 is a flow diagram illustrating a method for operating a network switch having a low latency transmission path as a time-sensitive network (TS) network switch, in accordance with an embodiment of the present invention.

FIG. 4 is a flow diagram 400 illustrating an exemplary method for operating a network switch having a low latency transmission path as a time-sensitive network (TS) network switch.

At 405 the method begins by identifying a specified time window for transmitting data packets over the low latency transmission path of a time-sensitive (TS) network switch. The network switch 100 shown in FIG. 1 may be a TS network switch having a low latency transmission path 185 and the specified time window for transmitting data packets over the low latency transmission path 185 may be identified by the switch fabric 180 of the network switch 100.

At 410 the method continues by configuring the destination egress port to be available to receive one or more data packets over the low latency transmission path during the specified time window. With reference to FIG. 1, one or more of the egress ports 160, 165, 170 may be configured as a destination egress port to be available to receive one or more data packets over the low latency transmission path 185 during the specified time window identified by the TS network switch 100.

The method continues at 415 by analyzing, during the specified time window, a first portion of one or more of the plurality of data packets to identify if the data packet is to be transmitted over the low latency transmission path from the ingress port to the destination egress port. The packet analyzer 125 and pattern matching table 190 of FIG. 1 are configured to analyze a first portion of one or more of the plurality of data packets received during the specified time window to identify if the data packet is to be transmitted over the low latency transmission path 185 from the ingress port to the destination egress port.

The method concludes at 420 by transmitting the data packet to the destination egress port over the low latency transmission path during the specified time window if, as a result of the analyses of 415, it is determined that the data packet is to be transmitted over the low latency transmission path 185 from the ingress port to the destination egress port. If, as a result of the analyses of 415, it is not determined that the data packet is to be transmitted over the low latency transmission path from the ingress port to the destination egress port, then the data packet is transmitted through the switch fabric. As shown in FIG. 1 the low latency transmission path 185 is used to transmit the data packets identified to be transmitted over the low latency transmission path during the specified time window and switch fabric 180 is used to transmit the data packets not identified to be transmitted over the low latency transmission path during the specified time window.

In various embodiments the disclosed network switch 100 provides more fixed and lower latency switching capabilities that prior art solutions. The low latency transmission 185 is implemented in an integrated circuit (IC) device comprising the network switch 100, and not in a dedicated external fast-path device (such as a Fast-Path FPGA) implemented in a separate IC device, wherein time-sensitive packets are not received at the input ports of the network switch. As such, the method and apparatus of the present invention adds a low latency transmission path 185 to an existing switch fabric 180. The network switch 100 may be implemented in any network application but may be most feasible when TSN features are controlling the flow of network traffic.

In one embodiment, the network switch may be implemented in an integrated circuit as a single semiconductor die, with the ingress port, the plurality of egress ports, the switch fabric, the packet queue and scheduler and the low latency transmission path entirely within the single semiconductor die In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

What is claimed is:

1. A method for operating a network switch, the method comprising:

establishing a low latency transmission path through a network switch, wherein the network switch comprises a plurality of ingress ports, a plurality of egress ports and a switch fabric comprising a packet queue and scheduler through which the plurality of ingress ports communicate with the plurality of egress ports and wherein the low latency transmission path bypasses the packet queue and scheduler of the switch fabric;

receiving a plurality of data packets at one or more of the plurality of ingress ports;

collecting a first portion of one or more of the plurality of data packets at a collection module;

for respective data packets of the one or more of the plurality of data packets, analyzing the first portion of the respective data packet to identify one of the plurality of egress ports as a destination egress port of the respective data packet and to identify if the respective data packet is to be transmitted over the low latency transmission path from the ingress port to the destination egress port, transmitting the respective data packet to the identified destination egress port responsive to scheduling by the packet queue and scheduler if the respective data packet is not identified to be transmitted over the low latency transmission path from the ingress port to the destination egress port, wherein respective cycles of the network switch include a first window of time and a second window of time that is shorter than and not contemporaneous with the first window of time, and traffic responsive to the scheduling by the packet queue and scheduler to the identified destination egress port is blocked during the second window of time; and transmitting the respective data packet to the identified destination egress port over the low latency transmission path during the second window of time in a respective cycle if the respective data packet is identified to be transmitted over the low latency transmission path from the ingress port to the destination egress port, wherein if the respective cycle includes a third window of time in addition to the first window of time and the second window of time, the third window of time is longer than the second window of time.

2. The method of claim 1, further comprising, setting a flag if the respective data packet is identified to be transmitted over the low latency transmission path from the ingress port to the identified destination egress port, the respective data packet being transmitted to the identified destination egress port over the low latency transmission path responsive to the set flag.

3. The method of claim 1, wherein respective cycles of the network switch include the third window of time that is not contemporaneous with the first window of time and that is not contemporaneous with the second window of time, wherein transmitting the respective data packet to the identified destination egress port responsive to the scheduling by the packet queue and scheduler is during the first window of time or the third window of time.

4. The method of claim 3 wherein respective cycles of the network switch have a one second duration and the first window of time is between 0 milliseconds (ms) and 850 ms, the second window of time is between 850 ms and 860 ms and the third window of time is between 860 ms and 1000 ms.

5. The method of claim 1 comprising configuring the destination egress port to be available to receive one or more respective data packets over the low latency transmission path during the second window of time in a respective cycle.

6. The method of claim 1, wherein the plurality of data packets are received at the one or more ingress ports in parallel.

7. The method of claim 1, wherein the analyzing of the first portion of the respective data packet to identify if the respective data packet is to be transmitted over the low latency transmission path from the ingress port to the destination egress port comprises matching the first portion of the respective data packet against a pattern matching table.

8. The method of claim 7, wherein the pattern matching table is a ternary content addressable memory.

9. The method of claim 1, further comprising, storing the respective data packet in a packet buffer of the low latency transmission path prior to transmitting the respective data packet to the destination egress port over the low latency transmission path.

10. The method of claim 1, wherein respective data packets of the plurality of data packets comprises a plurality of words, respective ones of the plurality of words comprises a number of bytes and the number of bytes of the first portion of the respective data packets of the one or more of the plurality of data packets collected at the collection module is less than the number of bytes of respective ones of the plurality of words of each data packet of the one or more of the plurality of data packets.

11. A network switch comprising:
a plurality of ingress ports;
a plurality of egress ports;
a switch fabric comprising a packet queue and scheduler through which the plurality of ingress ports communicate with the plurality of egress ports; and
a low latency transmission path for bypassing the packet queue and scheduler of the switch fabric,
wherein respective cycles of the network switch include a first window of time and a second window of time that is shorter than and not contemporaneous with the first window of time,
wherein the switch fabric is to:
receive a plurality of data packets at one or more of the plurality of ingress ports;
for respective data packets of the plurality of data packets, analyze a first portion of the respective data packet to identify one of the plurality of egress ports as a destination egress port of the data packet and to identify if the respective data packet is to be transmitted over the low latency transmission path from the ingress port to the destination egress port;
transmit the respective data packet to the identified destination egress port over the low latency transmission path during the second window of time in a respective cycle if the respective data packet is identified to be transmitted over the low latency transmission path from the ingress port to the destination egress port; and
transmit the respective data packet to the destination egress port responsive to the packet queue and scheduler if the respective data packet is not identified to be transmitted over the low latency transmission path from the ingress port to the destination egress ports, wherein traffic responsive to scheduling by the packet queue and scheduler to the identified destination egress port is blocked during the second window of time,
wherein if the respective cycle includes a third window of time in addition to the first window of time and the second window of time, the third window of time is longer than the second window of time.

12. The network switch of claim 11, wherein the network switch comprises a collection module to collect the first portion of the respective data packets of the plurality of data packets and a packet analyzer to analyze the first portion of the respective data packet.

13. The network switch of claim 11, wherein respective cycles of the network switch include the third window of time that is not contemporaneous with the first window of time and that is not contemporaneous with the second window of time, traffic responsive to the scheduling by the packet queue and scheduler transmitted to the identified destination egress port during the first and third windows of time.

14. The network switch of claim 13 wherein the switch fabric is to configure the destination egress port to be available to receive one or more of the respective data packets over the low latency transmission path during the second window of time in the respective cycle.

15. The network switch of claim 12, wherein the packet analyzer comprises a pattern matching table, wherein the packet analyzer is to match the first portion of the respective data packet against the pattern matching table to identify if the respective data packet is to be transmitted over the low latency transmission path from the ingress port to the destination egress port.

16. The network switch of claim 15, wherein the pattern matching table is a ternary content addressable memory.

17. The network switch of claim 11, wherein the low latency transmission path comprises a packet buffer to store the respective data packet prior to transmitting the data packet to the destination egress port over the low latency transmission path.

18. The network switch of claim 11, wherein respective data packets of the plurality of data packets comprises a plurality of words, respective ones of the plurality of words comprises a number of bytes and the number of bytes of the first portion of respective ones of the plurality of data packets collected at the collection module is less than the number of bytes of respective ones of the plurality of words of respective data packets of the plurality of data packets.

19. A switch fabric comprising:
a packet queue and scheduler through which a plurality of ingress ports in communication with the packet queue and scheduler communicate with a plurality of egress ports in communication with the packet queue and scheduler;
a low latency transmission path for bypassing the packet queue and scheduler;
a collection module to collect a first portion of one or more of a plurality of data packets received at one or more of the plurality of ingress ports;
a packet analyzer to analyze, for respective data packets of the one or more of the plurality of data packets, the first portion of the respective data packets to identify one of the plurality of egress ports as a destination egress port of the respective data packet and to identify if the respective data packet is to be transmitted over the low latency transmission path from the ingress port to the destination egress port,
wherein respective cycles include a first window of time and a second window of time that is shorter than and not contemporaneous with the first window of time, and traffic responsive to the packet queue and scheduler to the identified destination egress port is blocked during the second window of time,
the switch fabric to transmit the respective data packet to the identified destination egress port over the low latency transmission path during the second window of time in a respective cycle if the respective data packet is identified to be transmitted over the low latency transmission path from the ingress port to the destination egress port, and to transmit the respective data packet to the destination egress port responsive to scheduling by the packet queue and scheduler if the respective data packet is not identified to be transmitted over the low latency transmission path from the ingress port to the destination egress port, and
wherein if the respective cycle includes a third window of time in addition to the first window of time and the second window of time, the third window of time is longer than the second window of time.

20. The switch fabric of claim 19, wherein respective cycles of the network switch include the third window of time that is not contemporaneous with the first window of time and that is not contemporaneous with the second window of time, the switch fabric to transmit the respective data packet to the destination egress port responsive to the packet queue and scheduler during the first window of time, or the third window of time, if the respective data packet is not identified to be transmitted over the low latency transmission path from the ingress port to the destination egress port.

21. The switch fabric of claim 20, wherein respective cycles have a one second duration and the first window of time is between 0 milliseconds (ms) and 850 ms, the second window of time is between 850 ms and 860 ms and the third window of time is between 860 ms and 1000 ms.

22. The switch fabric of claim 21, wherein the switch fabric is a switch fabric of a time-sensitive network switch and wherein the switch fabric is further to configure the destination egress port to be available to receive one or more data packets over the low latency transmission path during the second window of time in the respective cycle.

* * * * *